United States Patent
Petesch

(10) Patent No.: US 8,296,431 B2
(45) Date of Patent: Oct. 23, 2012

(54) COMMUNICATION NETWORK INCLUDING MEANS FOR MANAGING CONFLICTS DURING THE EXECUTION OF SEVERAL COMMUNICATION SERVICES

(75) Inventor: Fabrice Petesch, Lannion (FR)

(73) Assignee: France Telecom, Paris (FR)

( * ) Notice: Subject to any disclaimer, the term of this patent is extended or adjusted under 35 U.S.C. 154(b) by 346 days.

(21) Appl. No.: 12/525,454

(22) PCT Filed: Jan. 30, 2008

(86) PCT No.: PCT/FR2008/050151
§ 371 (c)(1),
(2), (4) Date: Jul. 31, 2009

(87) PCT Pub. No.: WO2008/110717
PCT Pub. Date: Sep. 18, 2008

(65) Prior Publication Data
US 2010/0100634 A1  Apr. 22, 2010

(30) Foreign Application Priority Data

Jan. 31, 2007 (FR) ...................................... 07 52982

(51) Int. Cl.
*G06F 15/173* (2006.01)

(52) U.S. Cl. ....................................................... 709/225

(58) Field of Classification Search .................. 709/223, 709/227, 230, 225
See application file for complete search history.

(56) References Cited

U.S. PATENT DOCUMENTS

| 7,616,746 | B2 * | 11/2009 | O'Neill | 379/114.01 |
| 2003/0187992 | A1 | 10/2003 | Steenfeldt et al. | |
| 2003/0224781 | A1 * | 12/2003 | Milford et al. | 455/426.1 |
| 2005/0060415 | A1 * | 3/2005 | Satomi et al. | 709/227 |
| 2007/0214245 | A1 * | 9/2007 | Hamalainen et al. | 709/223 |

FOREIGN PATENT DOCUMENTS

EP  1 744 569  1/2007

OTHER PUBLICATIONS

"Digital Cellular telecommunications system (Phase 2+)", ETSI Standards, European Telecommunication Standards Institute, vol. 3-CN1, No. V731, Oct. 2006.

* cited by examiner

*Primary Examiner* — Jason Recek
(74) *Attorney, Agent, or Firm* — Cozen O'Connor

(57) ABSTRACT

A communications network including: n service managers (AS1, AS2, . . . , ASn), each adapted to execute an associated service; routing means (MR) adapted to receive protocol messages sent by a service manager, and to forward them to a terminal. The network also includes a conflict manager including: a set of packets, each packet containing rules for sorting protocol messages liable to be sent by at least two service managers; selection means for selecting a packet as a function of an indicator of the services that the terminal can access; sorting means for sorting protocol messages sent by at least two service managers upon execution of the associated services as a function of the content of a selected packet and forwarding the sorted protocol messages to the routing means (MR). Also disclosed are a conflict management method and a method of adding an additional service to a communications network.

6 Claims, 1 Drawing Sheet

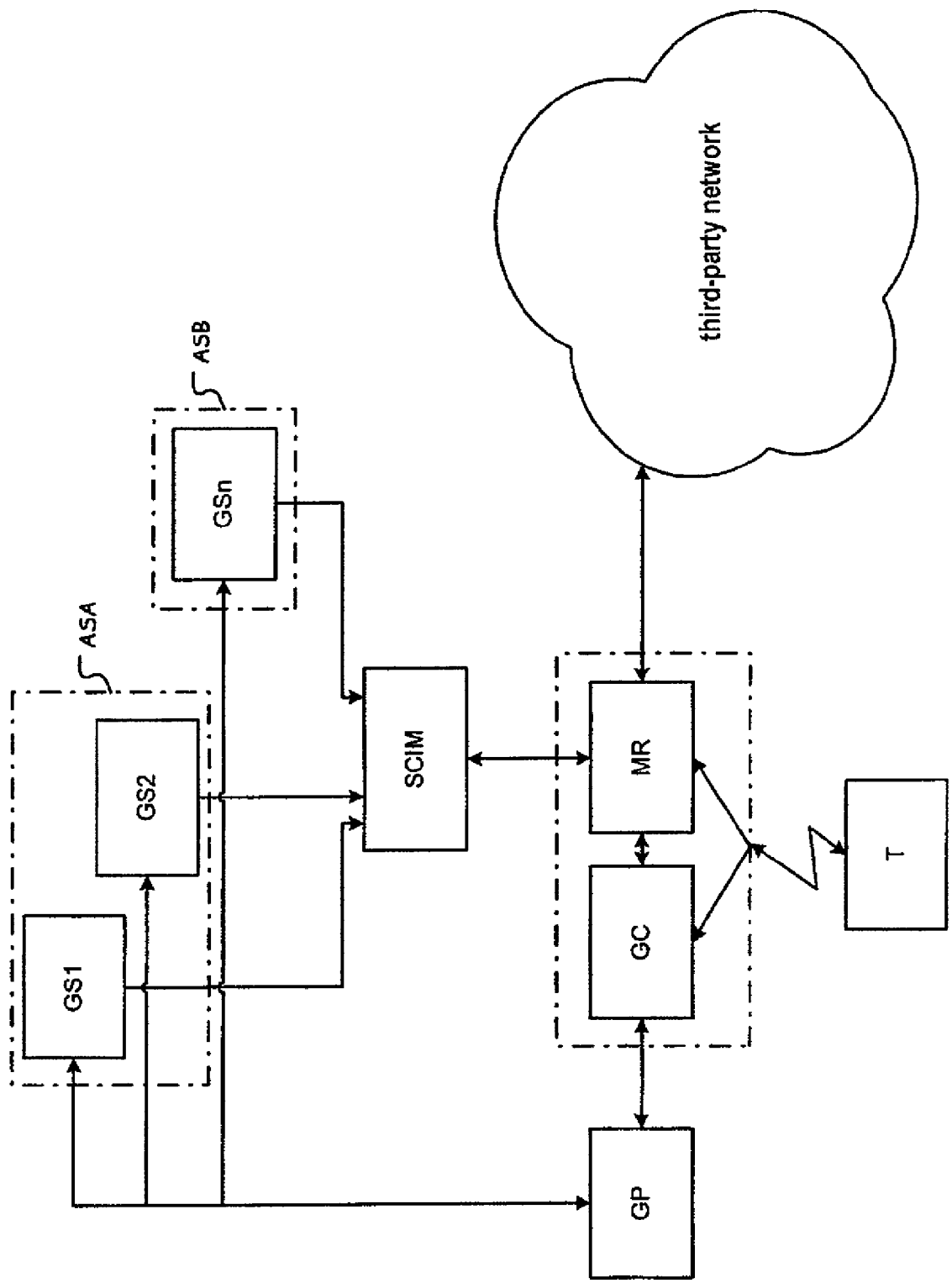

COMMUNICATION NETWORK INCLUDING MEANS FOR MANAGING CONFLICTS DURING THE EXECUTION OF SEVERAL COMMUNICATION SERVICES

RELATED APPLICATIONS

This is a U.S. National Phase Application under 35 USC §371 of International Application PCT/FR2008/050151, filed on Jan. 30, 2008.

This application claims the priority of French application no. 07/52982 filed on Jan. 31, 2007, and the content of which is hereby incorporated by reference.

FIELD OF THE INVENTION

The invention relates to telecommunications, and more particularly to a communications network including:
   n service managers, n being an integer greater than or equal to 2, each service manager being adapted to execute an associated service, i.e. to provide said service to a terminal connected to the network;
   routing means adapted to receive protocol messages sent by a service manager during the execution of the associated service, and to forward them to a terminal.

The invention finds an application in the creation of an IMS (IP Multimedia Subsystem) communications network between a plurality of terminals, for example. The word "terminal" must be understood in the widest sense here. It may be a telephone terminal, such as a fixed or mobile telephone, but equally it may be any terminal liable to be connected to a network to send or to receive audio and video data, text or digital data to or from one or more other terminals or the network.

BACKGROUND OF THE INVENTION

Such networks generally include one or more service managers, each adapted to manage the execution of an associated service, i.e. the provision of said service to a terminal, for example a voicemail service, a fun tone service, a click to dial service. A plurality of service managers can be grouped together in the same application manager, which thus provides a plurality of services.

A terminal connected to the network can access one or more services offered by the network, possibly subject to a subscription appropriate to those services.

A service is generally executed by exchanging protocol messages between the associated service manager and a terminal that is generally the terminal that subscribes to the service (as happens with the voicemail and the click-to-dial services, for example) or a terminal called by the terminal that subscribes to the service. The expression "terminal that subscribes to the service" is in practice a somewhat strained use of language, referring more accurately to a terminal that is connected to the network and belongs to a user of the network who subscribes to the service concerned, said user possibly having a plurality of terminals that can be connected to the network to use the same service.

The expression "protocol message" must be understood here in the widest sense as referring more generally to requests or associated responses exchanged in the context of setting up a connection between the terminal and the service manager, instructions, audio, video data or text exchanged between the terminal and the service manager during execution of the service. Each message conforms to an appropriate protocol (SIP, etc.).

Such networks also include routing means whose main function is to receive protocol messages from a service manager or from another terminal of the same network or a third-party network and forward them to a terminal, or conversely receive protocol messages from a terminal and to forward them to a service manager or to another terminal. In an IMS network, for example, the routing means are generally part of an input manager also having terminal identification, connection, or disconnection functions. The input manager of an IMS network according to the 3GPP 23.002 standard thus groups together all the I/P/S-CSCF (Interrogating-, Proxy-, Serving-Call State Control Function) functions. The protocol messages can be based on the Session Initiation Protocol (SIP), for example, or any other appropriate protocol, as a function of the type of protocol message.

In such networks, a problem of conflict can arise during parallel or successive execution of a plurality of services for different service managers. For example, executing a second service can modify a protocol message of a first service that is being executed, leading to a malfunction or even an interruption of the first service, or the execution of a second service may be inappropriate during the execution of a first service.

This applies if the fun tone service and the click to dial service are activated in parallel, for example.

The fun tone service enables a subscriber using a called terminal to cause a user of a calling terminal to hear a particular tone if the calling terminal has requested to be connected to the called terminal and is waiting to be connected to the called terminal; thus while the called terminal is ringing to indicate the arrival of a call, the calling terminal receives a particular tone chosen by the user of the called terminal.

The click to dial service enables a subscriber to request, via a first terminal (the first calling terminal, for example a PC), that a second terminal (the second calling terminal, for example a telephone) be connected to a terminal of another user (the called terminal). To this end, when the first calling terminal requests connection of the second calling terminal to the called terminal of the other user, the service manager of the click to dial service first rings the first calling terminal and then, after the user has picked up the first calling terminal, causes the called terminal of the other user to ring.

If a calling user subscribes to the fun tone service and to the click to dial service, a problem arises if, for example, the user requests via a first calling terminal that a second calling terminal be connected to a called terminal of another user. In this situation, the first calling terminal activates the click to dial service manager that initially causes the second calling terminal to ring. The second calling terminal receiving a connection request activates the fun tone service manager, which then sends a particular tone to the second calling terminal, i.e. to the click to dial service manager. Sending this particular tone is of no use, in particular because it provides no service to users; it can also lead to a malfunction of the click to dial service manager, which is not designed a priori to receive such tones.

If the same application manager is able to provide a plurality of services, it generally includes, in addition to the service managers, a conflict manager that groups together all the rules for resolving potential conflicts between all the services available via the application manager.

A first drawback of such conflict managers is that they must be modified if conflicts occur with services of other application managers. Such modifications can prove difficult to implement, in particular if the application managers are the property of different service providers having divergent economic interests.

A second drawback of such conflict managers is that they necessarily group together a very large number of conflict resolution rules, an exponential function of the total number of services present on the network. Also, if a conflict occurs, it is necessary to choose between a very large number of rules for resolving the conflict.

To alleviate the first drawback, the 3GPP 23.002 standard, which defines all functions of the elements of an IMS network, provides a service capability interaction management (SCIM) conflict manager installed in the network independently of the application managers. The function of the SCIM conflict manager is to manage any conflicts between two or more service managers. However, since the standard gives no information either as to how conflicts must or can be managed or on how to implement the conflict manager, it provides no practical solution for alleviating the second drawback. In practice no existing communications network has any such conflict manager.

SUMMARY OF THE INVENTION

One object of the invention is to provide a technical solution that is free of the drawbacks referred to above.

To this end, one aspect of the invention is directed to a communications network including:
- n service managers, n being an integer greater than or equal to 2, each service manager being adapted to execute an associated service; and
- routing means adapted to receive protocol messages sent by a service manager upon execution of the associated service, and to forward them to a terminal.

The network of the invention also includes a conflict manager including:
- a set of packets, each packet containing rules for sorting protocol messages liable to be sent by at least two service managers;
- selection means for selecting a packet as a function of an indicator of the services that the terminal can access; and
- sorting means for sorting protocol messages sent by at least two service managers upon execution of the associated services as a function of the content of a selected packet and forwarding the sorted protocol messages to the routing means.

Another aspect of the invention provides a method of managing conflicts during the execution of services provided to a terminal in a communications network of the invention. The method is characterized by the following steps:
- on connection of the terminal to the network, updating an indicator of the services that the terminal can access;
- selecting, as a function of the indicator, a packet of rules for sorting protocol messages sent by service managers; and
- as a function of the packets selected, sorting protocol messages sent by a plurality of service managers, and forwarding the sorted protocol messages to the terminal.

Thus the conflict manager of the invention selects appropriate resolution rules, and only those rules, as a function of the services that the terminal can access. It then manages any conflicts if it receives protocol messages from more than one service manager on the basis of a limited number of rules contained in the selected packet. This facilitates choosing an appropriate rule in the event of a conflict.

In one embodiment of the invention, the indicator of the services that the terminal can access is a multiplet comprising n bits, each bit of rank i between 1 and n being able to take two values:
- 1 if the terminal can access a service of rank i; or
- 0 otherwise.

Thus the indicator immediately provides information on the services which the subscriber can access.

Similarly, each packet can be indexed by an index comprising n bits, each bit of rank i between 1 and n being able to take two values:
- 1 if the packet contains rules for sorting protocol messages sent by the service manager of rank i and by other service managers of rank other than i; or
- 0 otherwise.

Thus the index of a packet immediately provides explicit information about the content of the packet.

If the indices of the packets and the indicators of the terminals have similar formats, for example as above, selecting a packet entails selecting a packet whose index is identical to the indicator.

Choosing appropriate formats for the indices of the packets and the indicators of the terminals thus facilitates the selection of a packet by a simple comparison.

Like a known network, a network of the invention can include:
- a profile manager having a list of the terminals connected to the network and a list of associated subscriber profiles, each subscriber profile including an indicator of the services that the terminal can access; and
- a connection manager adapted to identify a subscriber, connect said terminal to the network, and update the profile manager as a function of the services that the terminal can access.

Thus the conflict manager of the invention has no need of indicators of the services that the terminals can access and can use the existing indicators, which indicators can be supplied to the conflict manager simply at its request or systematically on updating an indicator.

Another aspect of the invention relates to a method of adding an additional service of rank n+1 to a communications network as described above and initially including n service managers. The method includes the following steps:
- adding a service manager of rank n+1;
- adding to the conflict manager packets of rules appropriate to resolving interaction conflicts between the service of rank n+1 and at least one service of rank i in the range 1 to n inclusive; and
- updating the indicator of the services that the terminal can access in the profile manager and for each terminal connected to the network.

The conflict manager thus enables fast and simple updating of the network on adding a new service, in that updating is effected without modifying either existing packets of rules or their respective indices. New packets are simply added.

BRIEF DESCRIPTION OF THE DRAWING

The invention can be better understood and its other features and advantages become apparent on reading the following description of implementations of a connection method and a connection system of the invention. The description is to be read with reference to the appended drawing in which the single FIGURE is a block diagram of a communications network of the invention.

DETAILED DESCRIPTION OF THE DRAWING

A network of the invention essentially comprises:
- n service managers GS1, GS2, . . . , GSn, each service manager GS1, GS2, . . . , GSn being adapted to execute an associated service S1, S2, . . . , Sn, where n is an integer greater than or equal to 2; in the example shown in the single FIGURE, n is equal to 3;

routing means MR adapted to forward to a terminal T protocol messages sent by a service manager on execution of the associated service; and an SCIM conflict manager.

Each service manager GS1, GS2, ..., GSn includes means for executing a single communications service S1, S2, ..., Sn, for example a voicemail service S1 (manager GS1), a fun tones service S2 (manager GS2), a click to dial service S3 (manager GS3), etc.

A plurality of service managers can be grouped together in the same application manager, for example if they are provided by the same service provider. In the FIGURE, for example, the voicemail service manager GS1 and the fun tones service manager GS2 are grouped together in the same application manager ASA that is the property of a telephone operator and the click to dial service manager GS3 is installed in an application server ASB that is the property of the proprietor of an Internet site accessible from a browser interface to the Internet.

Like a known network, the network can also include a connection manager GC and a profile manager GP. The function of the connection manager GC is to identify a terminal T requesting access to the network, to connect it, and to update the profile manager GP accordingly, in particular with an indicator of the services that the terminal can access. The profile manager GP has a list of terminals T connected to the network and for each terminal connected to the network a profile of the subscriber using the terminal, said profile including the indicator of the services that the subscriber can access via the connected terminal. The profile of the terminals (or subscribers) can be sent to the service managers, for example at the request of a service manager receiving a service execution request from a terminal.

According to the invention, the SCIM conflict manager of the network includes:

a set of packets P(011), P(101), ..., P(111), each packet containing rules for sorting protocol messages liable to be sent by at least two service managers;

selection means for selecting a packet as a function of an indicator of the services that the terminal can access; and sorting means for sorting protocol messages sent by at least two service managers at the time of execution of the associated services as a function of a content of a selected packet and forwarding the sorted protocol messages to the routing means MR.

As in prior art networks, the routing means MR then forward a protocol message received from the conflict manager to the destination terminal T.

Each packet contains rules for sorting protocol messages liable to be sent by two or more service managers. Each packet thus defines all of the rules necessary for resolving any conflicts between two or more services, in particular if they are executed simultaneously.

The conflict resolution rules contained in a packet depend in particular on:

any services in conflict; and/or the consequences of any conflict; and/or possible solutions to the conflict; and/or the benefit and/or the comfort of subscribers to the services concerned; and/or the technical and/or economic interests of the service providers concerned; and/or the technical, economic, political interests of third parties such as a network regulation organization, for example; etc.

The conflict resolution rules are chosen by the service providers or by a third party (network proprietor, network regulation organization, etc.) and are of essentially two types, depending on the situation:

protocol message modification: for example, protocol messages sent by a first service are modified by the conflict manager if the first service is executed in parallel with a second service; the modification of a protocol message by the conflict manager can go as far as the conflict manager eliminating or ignoring it; and change of sequence of modified protocol messages, as a function of priority rules: for example, protocol messages of a first service have a higher forwarding priority than protocol messages of a second service if the first service and the second service are executed in parallel.

For example, rules of the first type are used if:

stopping execution of the first service is not acceptable to the subscriber; or execution of the protocol messages of the first service leads to a serious malfunction that is harmful for the subscriber, the provider of the second service, the network or a third party.

For example, rules of the second type are used if the execution of a protocol message of the first service can be delayed without consequence for the subscriber, the overall execution of the first service, etc.

The conflict manager of the invention comprises as many packets of rules as there are admissible combinations of two or more services.

In the example shown in the FIGURE, it is considered that all combinations of services are admissible and the SCIM conflict manager therefore comprises four packets:

a packet P(011) for managing any conflicts on parallel execution of the services S1 and S2; for this purpose, the packet P(011) comprises all rules for sorting protocol messages liable to be sent by the service managers GS2 and GS1;

a packet P(101) for managing any conflicts on parallel execution of the services S1 and S2; for this purpose, the packet P(101) comprises all rules for sorting protocol messages liable to be sent by the service managers GS3 and GS1;

a packet P(110) for managing any conflicts on parallel execution of the services S1 and S2; for this purpose, the packet P(110) comprises all rules for sorting protocol messages liable to be sent by the service managers GS3 and GS2; and a packet P(111) for managing any conflicts on parallel execution of the services S1 and S2; for this purpose, the packet P(111) comprises all rules for sorting protocol messages liable to be sent by the service managers GS3, GS2, and GS1.

In another example, not shown, some combinations of services are considered inadmissible, i.e. the subscriber cannot access some combinations of services. In this situation, the conflict manager does not need any packets of rules to manage conflicts between the services of such an inadmissible combination of services. For example, if the providers of the service S1 and S3 decide that a network subscriber must not have simultaneous access to the services S1 and S3, then the packet P(101) is of no use and can be eliminated. The admissible/inadmissible combinations can be defined by the service providers, the network proprietor, a third-party organization, etc.

In one implementation of the invention, each packet is indexed by an index comprising n bits, each bit of rank i between 1 and n inclusive being able to take two values:

a first value, for example 1, if the packet contains rules for sorting protocol messages sent by the service manager of rank i and by other service managers of rank other than i; or a second value, for example 0, otherwise.

Accordingly, in the example in the FIGURE, each packet is indexed by an index (a binary number) comprising n=3 bits:

the bit of rank 1 (least significant bit) is at 1 if the packet contains rules for resolving conflicts between the service S1 of rank 1 and either the service S2 of rank 2 or the service S3 of rank 3;

the bit of rank 2 is at 1 if the packet contains rules for resolving conflicts between the service S2 of rank 1 and either the service S1 or the service S3; and the bit of rank 3 is at 1 if the packet contains rules for resolving conflicts between the service S3 and the service S1 or the service S2.

Thus the index associated with a packet gives an explicit indication of the content of the packet.

Each service manager grants a right to access its service to a terminal or not, possibly subject to registration or subscription.

In one implementation of the invention, the indicator of the services that the terminal can access is a multiplet comprising n bits, i.e. an n-bit binary number, each bit of rank i in the range 1 to n inclusive being liable to take two values:

a first value, for example 1, if the terminal has access to a service of rank i; and a second value, for example 0, otherwise.

Accordingly, in the FIG. 1 example, the indicator can take the following values, for example:

001, 010, 100 if the terminal has access to only one service S1, S2 or S3;

011, 101 or 110 if the terminal has access to two services S2, S1 or S3, S1 or S3, S2;

111 if the terminal has access to the three services S3, S2, and S1;

000 if the terminal has no access to any service.

By defining the index of each packet and the indicator of each terminal in this way by binary numbers constructed in a similar manner, the selection of a packet by a conflict manager simply consists in selecting the packet whose index is identical to the indicator of the terminal or the subscriber using it.

Of course other ways of indexing packets can be chosen. Equally, the indicators of the terminals can take a form other than a binary multiplet. The binary numbers can be converted into an equivalent decimal number, for example. However, preference is given to choosing indices and indicators having formats that greatly facilitate retrieving an appropriate packet as a function of an indicator.

An essential advantage of the invention is that it is very easy to add an additional service of rank n+1 to a network initially comprising n services. It is very easy to modify the network and the conflict manager of the invention to add a new service to the network. The following steps are sufficient for this purpose:

adding to the network a service manager of rank n+1;

adding to the conflict manager packets of rules appropriate for resolving conflicts of interaction between the service of rank n+1 and at least one service of rank i between 1 and n inclusive; and updating the indicator of the services that the terminal can access in the profile manager and for each terminal connected to the network.

Modifying the conflict manager consists in adding packets of rules necessary for resolving conflicts between the new service and the services previously installed without modifying existing packets managing conflicts between services installed previously. The indices of the earlier packets do not need to be modified either, it simply sufficing, if necessary, to add to them a most significant bit equal to 0 to obtain indices comprising n+1 bits. The new packets can be provided by a service provider seeking to propose their new service on the network, for example. They will be indexed by a number comprising n+1 bits of which the most significant bit is at 1.

Note that the conflict manager of the invention resolves conflicts occurring on simultaneously forwarding to a terminal a plurality of protocol messages sent by different service managers upon parallel execution of more than one service. In practice there are no conflicts in the protocol messages sent by the terminal, even if those protocol messages are sent to a plurality of service managers in the context of the parallel execution of more than one service. The terminal sends protocol messages successively, not simultaneously, with the result that each protocol message sent by the terminal can be executed normally without interfering with preceding or subsequent messages.

The invention claimed is:

1. A communications network comprising:

n service managers, n being an integer greater than or equal to 2, each service manager being adapted to execute an associated service;

a router adapted to receive protocol messages sent by a service manager, of the n service manager, upon execution of an associated service of the service manager, and to forward them to a terminal;

a profile manager having a list of terminals connected to the network and a list of associated subscriber profiles, each subscriber profile including an indicator of services that an associated terminal can access;

a connection manager adapted to identify a terminal, connect said identified terminal to the network, and update an indicator as a function of services that the identified terminal can access; and a conflict manager including:

a set of packets of rules, each packet containing rules for sorting protocol messages liable to be sent by at least two service managers;

a selector adapted to select a packet of rules as a function of an indicator of services that the terminal can access; and a sorter adapted to sort protocol messages sent to a given terminal by at least two service managers upon execution of associated services of the at least two service managers, the sorting being performed as a function of the content of a packet of rules selected for the given terminal from the set of packets using said selector and an indication included in a subscriber profile associated with the given terminal, and further adapted to forward the sorted protocol messages to the router.

2. The network according to claim 1, wherein the indicator is a multiplet comprising n bits, each bit of rank i between 1 and n inclusive being able to take one of the following two values:

a first value if the terminal has access to a service of rank i; or a second value otherwise.

3. The network according to claim 2, wherein each packet is indexed by an index comprising n bits, each bit of rank i between 1 and n inclusive being able to take one of the following two values:

a first value if the packet contains rules for sorting protocol messages sent by the service manager of rank i and by other service managers of rank other than i, or a second value otherwise, wherein selecting a packet includes selecting a packet having an index that is identical to the indicator.

4. The network according to claim 1, wherein each packet is indexed by an index comprising n bits, each bit of rank i between 1 and n inclusive being able to take one of the following two values:

a first value if the packet contains rules for sorting protocol messages sent by the service manager of rank i and by other service managers of rank other than i; or a second value otherwise.

5. A method of adding an additional service of rank n+1 to a communications network, said communications network being according to claim 1 and initially including n service managers, wherein the method comprises the steps of:

adding a service manager of rank n+1;

adding to the conflict manager packets of rules appropriate to resolving interaction conflicts between the service of rank n+1 and at least one service of rank i between 1 and n inclusive; and updating in the profile manager, for each terminal connected to the network, an indicator of services that the terminal can access.

6. A method of managing conflicts upon execution of services provided to a terminal in a communications network including:

n service managers, n being an integer greater than or equal to 2, each service manager being adapted to execute an associated service; and a router adapted to receive protocol messages sent by a service manager, of the n service managers, during the execution of an associated service of the service manager, and to forward them to a terminal; and a profile manager having a list of terminals connected to the network and a list of associated subscriber profiles, each subscriber profile including an indicator of services that an associated terminal can access;

wherein the method comprises the steps of:

identifying a terminal and connecting said terminal to the network;

on connection of the terminal to the network, updating an indicator of services that the terminal can access;

selecting, as a function of the indicator, a packet of rules for sorting protocol messages sent by service managers; and as a function of the packets selected, sorting protocol messages sent to a given terminal by a plurality of service managers, the sorting being performed as a function of the packets selected for the given terminal from the set of packets in said selecting and an indication included in a subscriber profile associated with the given terminal, and forwarding the sorted protocol messages to the given terminal.

* * * * *